United States Patent [19]

Ichiyanagi et al.

[11] Patent Number: 5,717,013
[45] Date of Patent: Feb. 10, 1998

[54] POLYPROPYLENE RESIN COMPOSITION

[75] Inventors: Kenji Ichiyanagi; Masayuki Yamazaki, both of Kawasaki, Japan

[73] Assignee: Tonen Chemical Corporation, Tokyo, Japan

[21] Appl. No.: 701,706

[22] Filed: Aug. 22, 1996

[30] Foreign Application Priority Data

Aug. 23, 1995 [JP] Japan .................... 7-237629

[51] Int. Cl.⁶ .................... C08J 5/15; C08J 5/00
[52] U.S. Cl. .................... 524/108; 524/117; 524/356; 524/357; 524/394; 524/399; 524/401; 524/437
[58] Field of Search .................... 524/117, 108, 524/356, 357, 394, 399, 401, 437

[56] References Cited

U.S. PATENT DOCUMENTS 5,342,868  8/1994  Kimura et al. .................... 524/117

FOREIGN PATENT DOCUMENTS

| | | |
|---|---|---|
| 0446358 | 9/1991 | European Pat. Off. . |
| 0622404 | 11/1994 | European Pat. Off. . |
| A 58-25341 | 2/1983 | Japan . |
| A 62-209151 | 9/1987 | Japan . |
| A 62-243635 | 10/1987 | Japan . |
| A 63-37148 | 2/1988 | Japan . |
| A 63-210152 | 8/1988 | Japan . |
| A 63-243150 | 10/1988 | Japan . |
| A 63-284242 | 11/1988 | Japan . |
| A 1311106 | 12/1989 | Japan . |
| A 1318011 | 12/1989 | Japan . |
| A 249047 | 2/1990 | Japan . |
| A 2102242 | 4/1990 | Japan . |
| A 2166104 | 6/1990 | Japan . |
| A 5156078 | 6/1993 | Japan . |
| A 5179052 | 7/1993 | Japan . |

*Primary Examiner*—Peter D. Mulcahy
*Attorney, Agent, or Firm*—Sughrue, Mion, Zinn, Macpeak & Seas, PLLC

[57] ABSTRACT

A polypropylene resin composition comprising (a) 100 parts by weight of a propylene polymer having an isotactic pentad fraction of 96% or more which is determined by $^{13}$C-NMR, (b) 0.01–5 parts by weight of at least one alkali salt selected from the group consisting of alkali carboxylates, alkali β-diketonates and alkali salts of β-ketacetate, (c) 0.01–5 parts by weight of an organophosphoric compound, and (d) 0.01–0.5 parts by weight of a lithium aluminum compound. The organophosphoric compound is represented by the following formula (I):

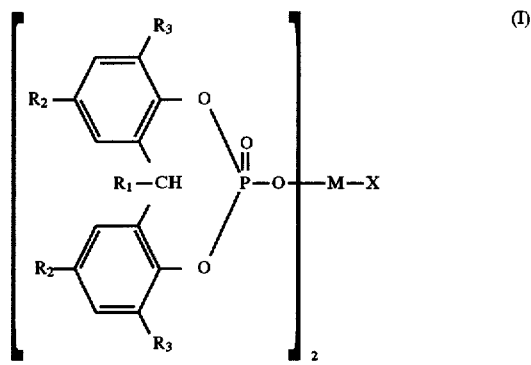

wherein $R_1$ is hydrogen or an alkyl group having 1 to 4 carbon atoms, each of $R_2$ and $R_3$ is independently hydrogen or an alkyl group having 1 to 12 carbon atoms, M is a metal atom of an element selected from the group consisting of Group III, IV, XIII and XIV elements of the Periodic Table, and X is —OH when M is a metal atom of an element of Group III or XIII of the Periodic Table or X is =O or (—OH)$_2$ when M is a metal atom of an element of Group IV or XIV of the Periodic Table, and the lithium aluminum compound is represented by the following formula (II):

$$[Al_2Li(OH)_6]_n \cdot Y \cdot mH_2O \qquad (II)$$

wherein Y is an inorganic or organic anion, n is a charge of Y and m is a number of 3 or less.

4 Claims, No Drawings

POLYPROPYLENE RESIN COMPOSITION

BACKGROUND OF THE INVENTION

The present invention relates to a resin composition of polypropylene, more specifically a resin composition of polypropylene excellent in transparency, heat resistance and stiffness and suitable for producing food containers, medical wares, laboratory wares, etc.

Polypropylene resin has been widely used as the material for injection molding, film production, sheet production, blow molding, etc. because polypropylene resin has relatively good heat resistance, chemical resistance, stiffness and transparency, and has good electrical properties and workability. However, the heat resistance, stiffness and transparency of polypropylene resin are still insufficient to apply it to food containers, medical wares, laboratory wares, etc., thereby limiting the use of polypropylene resin.

To improve on the stiffness, heat resistance or transparency of a polypropylene resin composition, various proposals have been made. For example, JP-A-1-311106, JP-A-1-318011 and JP-A-2-166104 disclose a method of polymerizing propylene in the presence of catalyst comprising a titanium trichloride composition, an organoaluminum compound and an organosilicon compound having Si—O—C bond and/or mercapto group. A method of adding a phosphate compound as a nucleating agent to polypropylene resin has been proposed in JP-A-62-209151, JP-A-62-243635, JP-A-63-37148, JP-A-63-210152, JP-A-63-243150, JP-A-63-284242, JP-A-2-49047, JP-A-2-102242, etc. However, the above proposals fail to provide a polypropylene resin composition which is excellent in all the stiffness, heat resistance and transparency.

To improve on the transparency, it has been proposed to add to a polypropylene resin a nucleating agent such as a metal salt of carboxylic acid, a metal salt of aromatic sulfonic acid, a metal salt of aromatic phosphoric acid, a sorbitol compound (JP-A-58-25341 and JP-A-56-30449). Among these nucleating agents, the sorbitol compound has been known most effective for improving the transparency. However, the sorbitol compound involves problems of low heat resistance and stiffness as well as bad odor, bleedout, etc. Further, since the sorbitol compound is expensive, the use thereof results in a high production cost. JP-A-54-88950 discloses a transparent plastic composition comprising polypropylene, a styrene-ethylene-butylene-styrene block copolymer and a softening agent such as ethylene-vinyl acetate copolymer and ethylene-propylene copolymer. However, the proposed plastic composition is inferior in the stiffness and heat resistance.

As mentioned above, although the proposed methods are somewhat successful in improving the stiffness, heat resistance and transparency individually, no method has been proposed to simultaneously improve all the stiffness, heat resistance and transparency. Therefore, it has been expected that the polypropylene resin composition could be widely applied to various fields if a composition well balanced in the stiffness, heat resistance and transparency is provided.

OBJECT AND SUMMARY OF THE INVENTION

Accordingly, an object of the present invention is to provide a polypropylene resin composition excellent and well balanced in the stiffness, heat resistance and transparency.

As a result of the intense research in view of the above objects, the inventors have found that the stiffness, heat resistance and transparency can be simultaneously improved by synergetic effects of adding, into a high crystalline polypropylene having a specific isotactic pentad fraction, particular amounts of an alkali salt, an organophosphoric compound and a lithium aluminum compound, all of which are specified below. The present invention has been accomplished based on this finding.

Thus, in a first aspect of the present invention, there is provided a polypropylene resin composition comprising (a) 100 parts by weight of a polypropylene having an isotactic pentad fraction of 96% or more which is determined by $^{13}$C-NMR, (b) 0.01–5 parts by weight of at least one alkali salt selected from the group consisting of alkali carboxylates, alkali β-diketonates and alkali salts of β-ketacetates, (c) 0.01–5 parts by weight of at least one organophosphoric compound represented by the following formula (I):

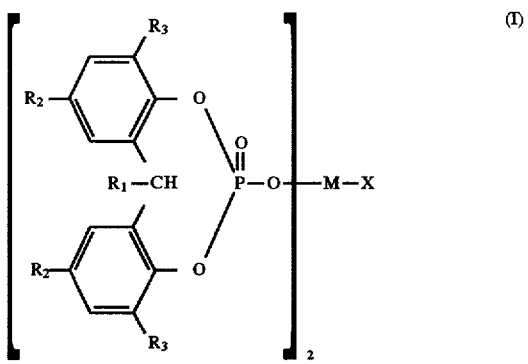

wherein $R_1$ is hydrogen or an alkyl group having 1 to 4 carbon atoms, each of $R_2$ and $R_3$ is independently hydrogen or an alkyl group having 1 to 12 carbon atoms, M is a metal atom of an element selected from the group consisting of Group III (IIIA), IV (IVA), XIII (IIIB), and XIV (IVB) elements of the Periodic Table, and X is —OH when M is a metal atom of an element of Group III (IIIA) or XIII (IIIB) of the Periodic Table or X is =O or (—OH)$_2$ when M is a metal element of an element of Group IV (IVA) or XIV (IVB) of the Periodic Table, and (d) 0.01–0.5 parts by weight of at least one lithium aluminum compound represented by the following formula (II):

$$[Al_2Li(OH)_6]_n \cdot Y \cdot mH_2O \qquad (II)$$

wherein Y is an inorganic or organic anion, n is a charge of Y and m is a number of 3 or less.

The above group designation of M is expressed according to the group designation adopted by the IUPAC with the traditional group designation in parentheses.

DETAILED DESCRIPTION OF THE INVENTION

The present invention will be described below more in detail.

(a) Polypropylene

The polypropylene used in the present invention is substantially a homopolypropylene constituted of 99.5 weight % or more of propylene units.

The production method of the polypropylene is not restricted so long as the method produces polypropylene having the properties as specified in the present invention. Among the methods, gas phase polymerization in the presence of a stereo-specific polymerization catalyst is preferable.

The stereo-specific polymerization catalyst may include a two-component catalyst consisting of a transition metal component and organometallic component, or a three-component catalyst consisting of the above two components and an electron donating compound containing nitrogen, phosphorus, sulfur, oxygen, silicon, etc. The transition metal component may be a halogeno-titanium compound such as titanium trichloride, titanium tetrachloride, ethoxytitanium trichloride, etc., and a contact product of the halogenated titanium compound and a magnesium compound such as a magnesium halide. The organometallic component may be an alkylaluminum compound which may be a halide, hydride or alkoxide.

The stereo-regularity of the polypropylene employed in the present invention is shown by an isotactic pentad fraction (IPF) of 96% or more. An IPF less than 96% results in a poor stiffness. The isotactic pentad fraction is a fraction ratio of five continuous propylene monomer units bonded isotactically to the total five continuous propylene monomer units. Namely, in an isotactic pentad, all the five side methyl groups are in the "meso" relation to each other.

The IPF was determined by a method described in Macromolecules, 6, 925 (1973) which includes measuring $^{13}$C-NMR spectra. The assignment of each peak was made according to a method described in Macromolecules, 8, 687 (1975). The IPF was calculated by dividing the peak intensity of mmmm peak by the total of the peak intensities of all the methyl carbons in the polypropylene.

The melt flow rate (MFR), measured at 230° C. under a load of 2.16 kg, of the polypropylene used in the present invention is preferably 0.2–100 g/10 min, more preferably 0.5–3 g/10 min for blow molding and 0.5–50 g/10 min for injection molding.

(b) Alkali salt

The alkali salt used in the present invention is at least one selected from the group consisting of (i) alkali carboxylates, (ii) alkali β-diketonates and (iii) alkali salts of β-ketacetates. These are salts between an alkali such as lithium, sodium, potassium, etc. and a carboxylic acid, β-diketone or β-ketacetate, and may be produced by known methods.

As the carboxylic acid for the alkali carboxylate (i), exemplified are aliphatic monocarboxylic acids such as acetic acid, propionic acid, acrylic acid, octyl acid, nonanoic acid, decanoic acid, lauric acid, myristic acid, palmitic acid, stearic acid, oleic acid, ricinoleic acid, 12-hydroxystearic acid, behenic acid, montanic acid, melissic acid, β-dodecylmercaptopropionic acid, β-N-laurylaminopropionic acid, β-N-methyl-N-laurylaminopropionic acid, etc.; aliphatic polycarboxylic acids such as malonic acid, succinic acid, adipic acid, maleic acid, azelaic acid, sebasic acid, dodecanedicarboxylic acid, citric acid, butanetricarboxylic acid, butanetetracarboxylic acid, etc.; alicyclic mono- or polycarboxylic acids such as naphthenic acid, cyclopentanecarboxylic acid, 1-methylcyclopentanecarboxylic acid, 2-methylcyclopentanecarboxylic acid, cyclopentenecarboxylic acid, cyclohexanecarboxylic acid, 1-methylcyclopentenecarboxylic acid, cyclohexenecarboxylic acid, 4-cyclohexene-1,2-dicarboxylic acid, etc.; and aromatic mono- or polycarboxylic acids such as benzoic acid, toluic acid, xylylic acid, salicylic acid, phthalic acid, trimellitic acid, etc.

Of the alkali salts, alkali salts of aliphatic monocarboxylic acids are preferable. More preferred are lithium salts of aliphatic monocarboxylic acids, in particular, $C_8$–$C_{20}$ aliphatic monocarboxylic acids.

The β-diketone for the alkali β-diketonate may include acetylacetone, pivaloylacetone, palmitoylacetone, benzoylacetone, pivaloylbenzoylacetone, dibenzoylmethane, etc.

The β-ketacetate for the alkali salt of β-ketacetate may include ethyl acetoacetate, octyl acetoacetate, lauryl acetoacetate, stearyl acetoacetate, ethyl benzoylacetate, lauryl benzoylacetate, etc.

(c) Organophosphoric compound

The organophosphoric compound used in the present invention is represented by the following formula (I):

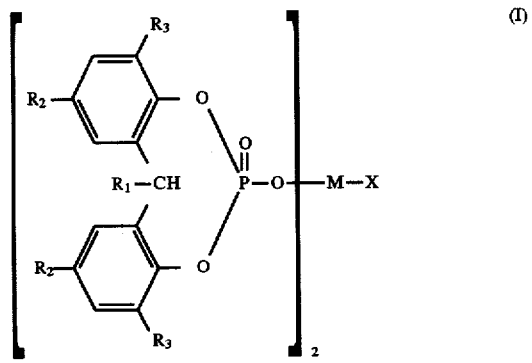

wherein $R_1$ is hydrogen or an alkyl group having 1 to 4, preferably hydrogen or methyl, each of $R_2$ and $R_3$ is independently hydrogen or an alkyl group having 1 to 12, preferably methyl or t-butyl, M is a metal atom of an element selected from the group consisting of Group III, IV, XIII and XIV elements of the Periodic Table, and X is —OH when M is a metal atom of Group III or XIII element of the Periodic Table or X is =O or (—OH)$_2$ when M is a metal atom of Group IV or XIV element of the Periodic Table. At least one of the compounds of the formula (I) is used in the resin composition of the present invention.

M in the formula (I) is exemplified by aluminum, gallium, germanium, sin, titanium, zirconium, etc., and preferably aluminum.

The specific examples of the organophosphoric compound may include the following compounds (1) to (6) which are described in JP-A-5-156078.

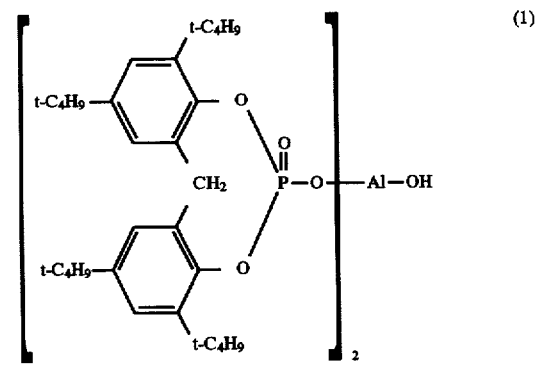

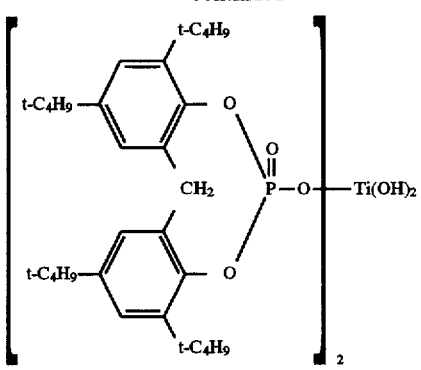 (2)

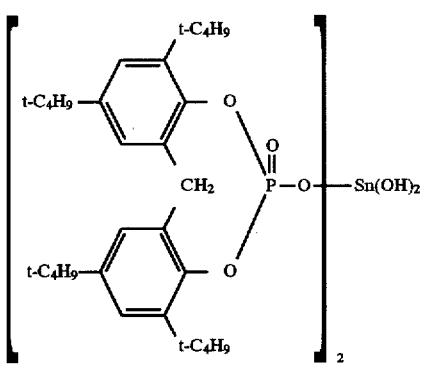 (3)

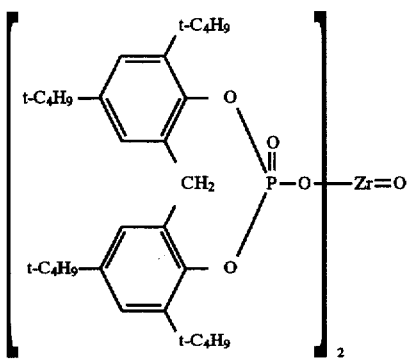 (4)

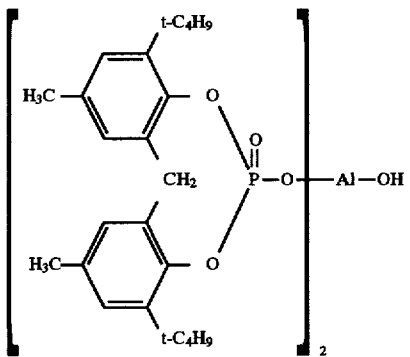 (5)

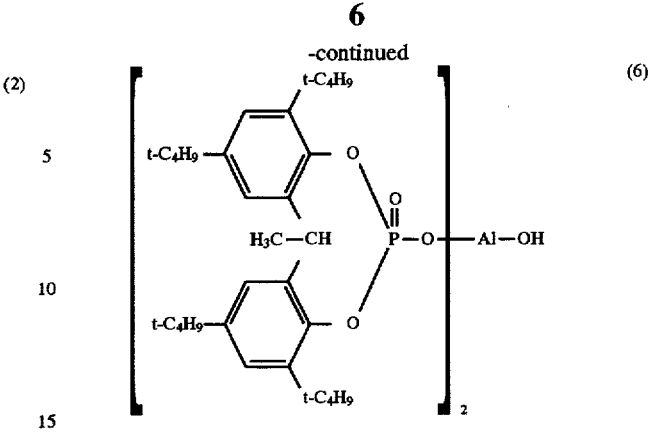 (6)

(d) Lithium aluminum compound

The lithium aluminum compound used in the present invention is represented by the following formula (II):

$$[Al_2Li(OH)_6]_n \cdot Y \cdot mH_2O \qquad (II)$$

wherein Y is an inorganic or organic anion, n is a charge of Y and m is a number of 3 or less.

As the inorganic or organic union represented by Y in the formula (II), exemplified are anions derived from carbonic acid, sulfuric acid, oxyacid of chlorine such as perchloric acid, oxyacid of phosphorus such as phosphoric acid, phosphorous acid and metaphosphoric acid, acetic acid, propionic acid, adipic acid, benzoic acid, phthalic acid, terephthalic acid, maleic acid, fumalic acid, succinic acid, p-hydroxybenzoic acid, salicylic acid, picric acid, etc. Y may be one or a combination of two or more of these anions. Preferred anions are those derived from carbonic acid, sulfuric acid, oxyacids of chlorine and oxyacids of phosphorus.

The lithium aluminum compounds described above are disclosed in JP-A-5-179052.

(e) Other additives

The polypropylene resin composition of the present invention may contain, according to its use, other additives within an amount not departing from the purpose of the present invention. Examples for such additives may include granulates, powders or scales of silica, alumina, talc, mica, clay, kaolin, wollastonite, zeolite, silica-alumina, calcium carbonate, aluminum hydroxide, titanium dioxide, zinc oxide, magnesium oxide, zirconium oxide, zinc sulfide, barium sulfate, calcium sulfate, calcium phosphate, magnesium phosphate, aluminum silicate, silicon nitride, glass, hydrotalcite, etc. Other examples may include inorganic fillers such as glass fiber, potassium titanate fiber, carbon fiber, carbon black, graphite, mica ceramics fiber, metal fiber, etc. with or without being subjected to surface treatment with a silane coupling agent, titanate coupling agent, boron coupling agent, aluminate coupling agent or zircoaluminate coupling agent; organic fillers such as wood powder, pulp, synthetic fiber, natural fiber, etc.; antioxidants of phenol type, thioether type or phosphorus type; light stabilizers; clarifiers; nucleating agents such as organic carboxylic acids and metal salts thereof; lubricants; antistatic agents; anti-fogging agents; anti-blocking agent; pigments; heavy metal deactivators; radical initiators such as peroxides; dispersants such as metallic soap; etc.

The components (b) to (d) described above are blended to 100 weight parts of the polypropylene in an amount of 0.01–5 weight parts, preferably 0.05–0.5 weight parts for the alkali salt (b), 0.01–5 weight parts, preferably 0.05–0.5 weight parts for the organophosphoric compound (c), and 0.01–0.5 weight parts, preferably 0.01–0.2 weight parts for the lithium aluminum compound (d).

When the blended amount of each of the components (b) to (d) is lower than the above lower limit, any of the heat resistance, stiffness and transparency is low. On the other hand, a blended amount of each of the components (b) to (d) exceeding the above upper limit exhibits no additional effect. In addition of this, the addition of excess amount of the components (b) to (d) is disadvantageous in view of production cost because they are expensive compounds.

The weight ratio of the components (b), (c) and (d) ((b):(c):(d)) is preferably 1:0.3–3:0.1–5.

The polypropylene resin composition of the present invention may be produced by blending the above components in Henschel mixer, super mixer, ribbon blender, etc. and then melt-kneading at 170°–300° C. in a single-screw extruder, twin-screw extruder, Banbury mixer, Brabender, roll, etc. Masterbatching may be also applicable. The kneaded product then may be extruded into granulates or pellets.

The present invention will be further described while referring to the following Examples which should be considered to illustrate various preferred embodiments of the present invention.

EXAMPLES 1 TO 4

1. Starting material
   (1) Polypropylene (PP)
      Isotactic pentad fraction (IPF): 97%
      Melt flow rate (MFR): 1.6 g/10 min
   (2) Alkali salt
      Lithium stearate.
   (3) Organophosphoric compound
      Organophosphoric compound represented by the formula (1).
   (4) Lithium aluminum compound
      [Al$_2$Li(OH)$_6$]$_2$CO$_3$.1.6H$_2$O
   (5) Antioxidant
      Phenol-type antioxidant: "Irganox 1010" (trade name) manufactured by Ciba-Geigy (Japan) Limited.
      Phosphorus-type "Irgaphos 168" (trade name) manufactured by Ciba-Geigy (Japan) Limited.

2. Kneading

A mixture of 100 weight parts of the above polypropylene (PP), 0.05 weight parts of each of the above phenol-type antioxidant and phosphorus-type antioxidant, and respective amounts of the alkali salt (compound (b)) and organophosphoric compound (compound (c)) and the lithium aluminum compound (compound (d)) as shown in Table 1 were blended in Henschel mixer. Then blended product was melt-kneaded in a single-screw extruder (outer diameter: 50 mm) at 230° C. for 30 minutes to 5 hours. The kneaded product was extruded from a die into pellets under conditions of a die temperature of 230° C., a screw rotation number of 60 rpm, and an extruder output of 20 kg/h.

3. Molding

The pellets thus obtained were injection-molded by an injection molding machine under the conditions of resin temperature of 230° C., injection pressure of 400 kgf/cm$^2$ and mold temperature of 60° C. to prepare each specimen.

4. Measurement of properties

The properties of each specimen were measured according to the following methods. The results are shown in Table 1.

(1) Flexural modulus (kgf/cm$^2$): Measured according to JIS K 7203 on a specimen of 110 mm long×10 mm wide×4 mm thick.

(2) Thermal deformation temperature (°C.): Measured according to JIS K 7207 on a specimen of 127 mm long×12.7 mm wide×4 mm thick.

(3) Haze value (%): Measured according to ASTM D1003-61 on a specimen of 1 mm thick.

(4) Odor: The presence of odor was evaluated by sensory test according to the standards of X for offensive odor and ○ for no odor.

TABLE 1

| | Example No. | | | |
|---|---|---|---|---|
| | 1 | 2 | 3 | 4 |
| Composition PP | | | | |
| IPF (%) | 97 | 97 | 97 | 97 |
| Amount (wt. parts) | 100 | 100 | 100 | 100 |
| Amount of additives (wt. parts) | | | | |
| Compound (b) | 0.1 | 0.15 | 0.1 | 0.05 |
| Compound (c) | 0.1 | 0.05 | 0.1 | 0.05 |
| Compound (d) | 0.025 | 0.05 | 0.1 | 0.1 |
| Properties | | | | |
| Flexural modulus (kgf/cm$^2$) | 22700 | 22000 | 22500 | 22200 |
| Thermal deformation temperature (°C.) | 129 | 128 | 130 | 126 |
| Haze value (%) | 18.2 | 18.4 | 17.9 | 18.9 |
| Odor | ○ | ○ | ○ | ○ |

Comparative Example 1

The same procedures as in Example 1 were repeated except for blending 0.1 weight part of calcium stearate (CaSt) in place of the compound (d). The results are shown in Table 2.

Comparative Example 2

The same procedures as in Example 1 were repeated except for blending 0.1 weight part of calcium stearate (CaSt) and 0.2 weight parts of 1,3:2,4-di(p-methylbenzylidene)sorbitol ("Gelall MD" (trade name) manufactured by Shin Nippon Rika K.K.) in place of the compounds (b), (c) and (d). The results are shown in Table 2.

Comparative Example 3

The same procedures as in Example 1 were repeated except for blending, in place of blending the compounds (b), (c) and (d), only 0.1 weight part of CaSt used in Comparative Example 1. The results are shown in Table 2.

Comparative Example 4

The same procedures as in Example 4 were repeated except for not blending the compounds (b) and (c). The results are shown in Table 2.

Comparative Example 5

The same procedures as in Example 2 were repeated except for using a polypropylene having an IPF of 94% and an MFR of 1.5 g/10 min in place of the polypropylene used in Example 2. The results are shown in Table 2.

TABLE 2

|  | Comparative Example No. | | | | |
|---|---|---|---|---|---|
|  | 1 | 2 | 3 | 4 | 5 |
| Composition |  |  |  |  |  |
| PP |  |  |  |  |  |
| IPF (%) | 97 | 97 | 97 | 97 | 94 |
| Amount (wt. parts) | 100 | 100 | 100 | 100 | 100 |
| Amount of additives (wt. parts) |  |  |  |  |  |
| Compound (b) | 0.1 | — | — | — | 0.15 |
| Compound (c) | 0.1 | — | — | — | 0.05 |
| Compound (d) | — | — | — | 0.1 | 0.05 |
| MBS[(1)] | — | 0.2 | — | — | 13 |
| CaSt | 0.1 | 0.1 | 0.1 | — | — |
| Properties |  |  |  |  |  |
| Flexural modulus (kgf/cm$^2$) | 20300 | 19500 | 15800 | 16300 | 20100 |
| Thermal deformation temperature (°C.) | 129 | 119 | 102 | 103 | 127 |
| Haze value (%) | 21.4 | 27.1 | 54.4 | 51.1 | 17.5 |
| Odor | O | X | O | O | O |

Note: [(1)]1,3:2,4-di(p-methlbenzylidene)sorbitol

As seen from the above results, the polypropylene resin compositions of the present invention showed a high flexural modulus, a high thermal deformation temperature and a low haze value, namely, well balanced in the stiffness, heat resistance and transparency. On the other hand, the polypropylene resin composition of Comparative Example 1 was poor in stiffness and transparency because it contained no lithium aluminum compound. The polypropylene resin composition of Comparative Example 4 was poor in stiffness, heat resistance and transparency because neither the alkali salt nor the organophosphoric compound was contained therein. Since the polypropylene resin compositions of Comparative Examples 2 and 3 did not contain any of the alkali salt, the organophosphoric compound and the lithium aluminum compound, they were extremely poor in stiffness, heat resistance and transparency. The polypropylene resin composition of Comparative Example 5 showed a poor stiffness because the IPF of the polypropylene used was lower than the range specified in the present invention.

As described above, since the high crystalline polypropylene is blended with the alkali salt, the organophosphoric compound and the lithium aluminum compound, the polypropylene resin composition of the present invention is superior in all the stiffness, heat resistance and transparency. For example, the polypropylene resin composition has a flexural modulus of 21000 kgf/cm$^2$ or more, a thermal deformation temperature of about 125° C. or higher, and a haze value of 20% or less. Further, the resin composition is free from offensive odor resulted from the additives. Such a polypropylene resin composition is widely applicable to food containers, medical wares, laboratory wares, etc.

What is claimed is:

1. A polypropylene resin composition comprising (a) 100 parts by weight of a polypropylene having an isotactic pentad fraction of 96% or more which is determined by $^{13}$C-NMR, (b) 0.01–5 parts by weight of at least one alkali salt selected from the group consisting of alkali carboxylates, alkali β-diketonates and alkali salts of β-ketacetates, (c) 0.01–5 parts by weight of at least one organophosphoric compound represented by the following formula (I):

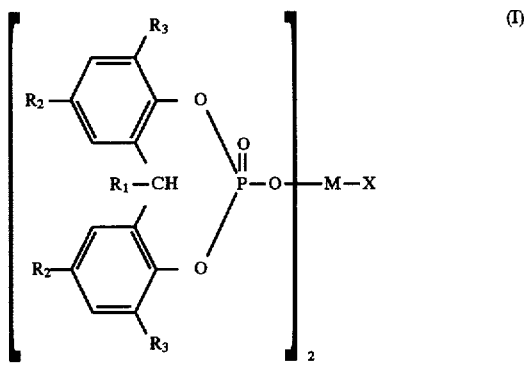

wherein $R_1$ is hydrogen or an alkyl group having 1 to 4 carbon atoms, each of $R_2$ and $R_3$ is independently hydrogen or an alkyl group having 1 to 12 carbon atoms, M is a metal atom of an element selected from the group consisting of Group III, IV, XIII and XIV elements of the Periodic Table, and X is —OH when M is a metal atom of an element of Group III or XIII of the Periodic Table or X is =O or (—OH)$_2$ when M is a metal atom of an element of Group IV or XIV of the Periodic Table, and (d) 0.01–0.5 parts by weight of at least one lithium aluminum compound represented by the following formula (II):

$$[Al_2Li(OH)_6]_n \cdot Y \cdot mH_2O \quad (II)$$

wherein Y is an inorganic or organic anion, n is a charge of Y and m is a number of 3 or less.

2. The polypropylene resin composition according to claim 1, wherein the amount of said alkali salt is 0.05–0.5 parts by weight.

3. The polypropylene resin composition according to claim 1, wherein the amount of said organophosphoric compound is 0.05–0.5 parts by weight.

4. The polypropylene resin composition according to claim 1, wherein the amount of said lithium aluminum compound is 0.05–0.2 parts by weight.

* * * * *